March 24, 1970  M. HANKILA  3,502,112
PIPE CLAMP

Filed July 5, 1966  2 Sheets-Sheet 1

INVENTOR.
MICHAEL HANKILA
BY *M. A. Hobbs*
ATTORNEY

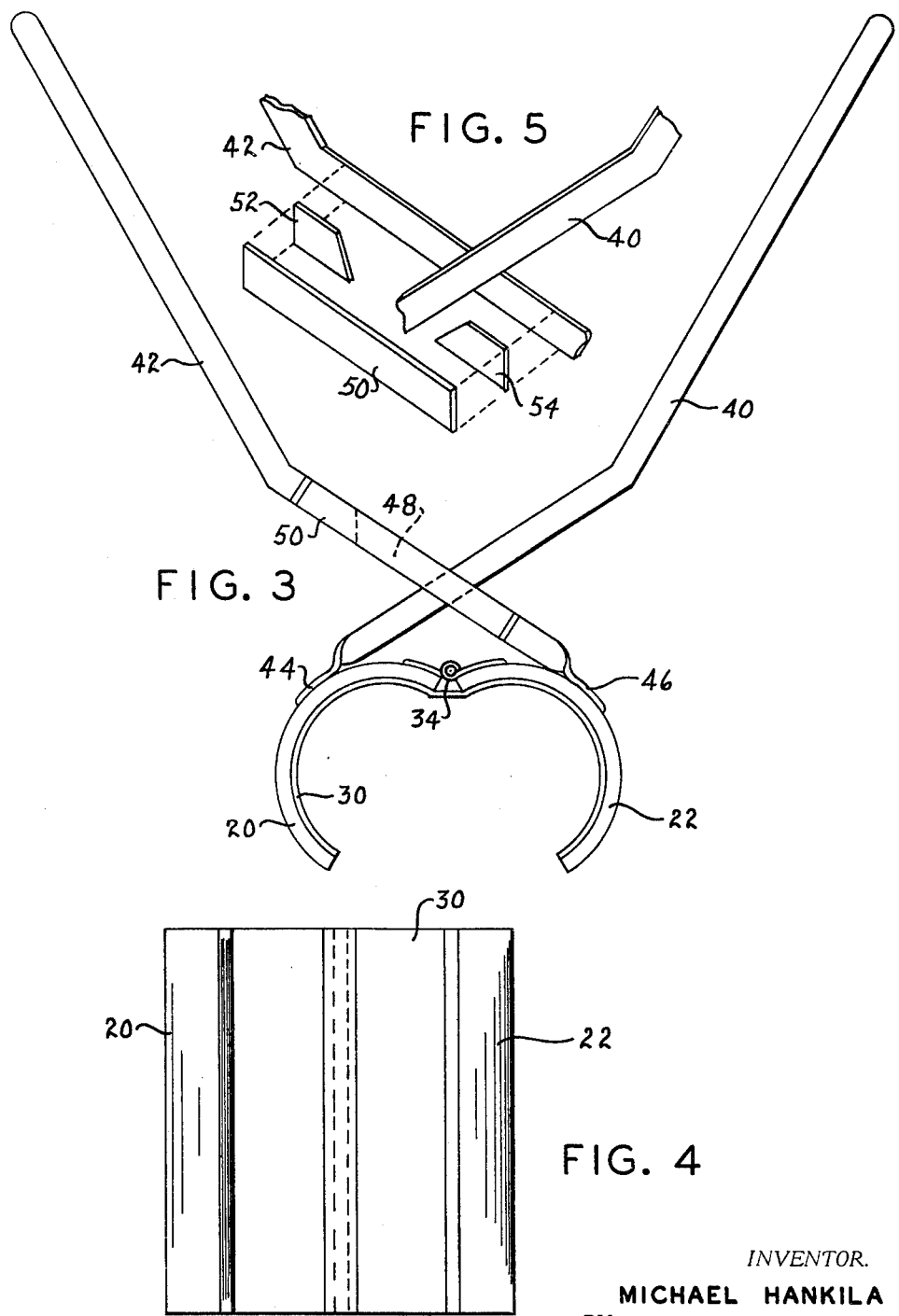

United States Patent Office 3,502,112
Patented Mar. 24, 1970

3,502,112
PIPE CLAMP
Michael Hankila, 307 Cecil Ave.,
Buchanan, Mich. 49107
Filed July 5, 1966, Ser. No. 562,641
Int. Cl. F16l 55/16; B25b 7/14
U.S. Cl. 138—99                                5 Claims

ABSTRACT OF THE DISCLOSURE

An emergency pipe clamp for use in temporarily repairing a leak in a pipe, comprising two pivotally connected arcuate pads having a layer of sealing material on the inner surfaces of the pads, a handle connected at one end to one of said pads, a second handle connected at one end to the other of said pads, one of said handles having a means forming a slot for receiving the other of said handles for movement of said other handle longitudinally with respect to said one handle in opening and closing said pads.

---

The present invention relates to a pipe clamp and more particularly to a clamp for emergency water main breaks.

Leaks frequently occur in water mains along the length of the pipe remote from a joint as a result of rust and deterioration of the metal side walls of the pipe. Leaks of this type are often relatively small holes or splits, but because of the relatively high water pressure in the mains, a large amount of water is lost in a short time. In the normal practice of repairing the leaks, one of the main valves in the system is closed and the pipe is uncovered for repair; however, as a result of faulty valves and/or large segments of the system between valves, the water continues to flow unabated for relatively long periods of time after the repair work has commenced. The mains with the foregoing type of break are often repaired by the use of a clamp which is permanetly attached to the pipe by securing it tightly around the pipe with the use of bolts or screws and which clamps a gasket onto the pipe to seal the leak. This permanent clamping operation is occasionally difficult and time consuming and the hole in the ground around the leak is usually relatively small, so that the repairmen must work in a confined space which readily fills with water which must be removed before the clamping operation can be performed. It is therefore one of the principal objects of the persent invention to provide an emergency or temporary clamp which can be easily and quickly assembled in place on the pipe in the confined space regardless of whether water is flowing from the leak or whether the hole around the leak contains or is filled with water.

Another object of the invention is to provide an emergency clamp for water mains which can be effectively clamped to the main without repairmen reaching under or around or getting into close proximity to the main, and which effectively seals the pipe around the leak for some distance therefrom to eliminate interference from foreign objects and pipe roughness in forming an effective seal.

Still another object is to provide a pipe clamp of the foregoing type which is relatively simple in construction and operation and which is so constructed that the temporary seals can be effective without the repairmen entering the hole or first removing the water therefrom.

Further objects and advantages of the invention will become apparent from the following description and accompanying drawings, wherein:

FIGURE 3 is a side elevational view showing the clamp in its opened position;

FIGURE 4 is a bottom view of the clamp as viewed in the previous figures; and

FIGURE 5 is an exploded perspective view of a portion of the operating handle structure.

Figure 2:
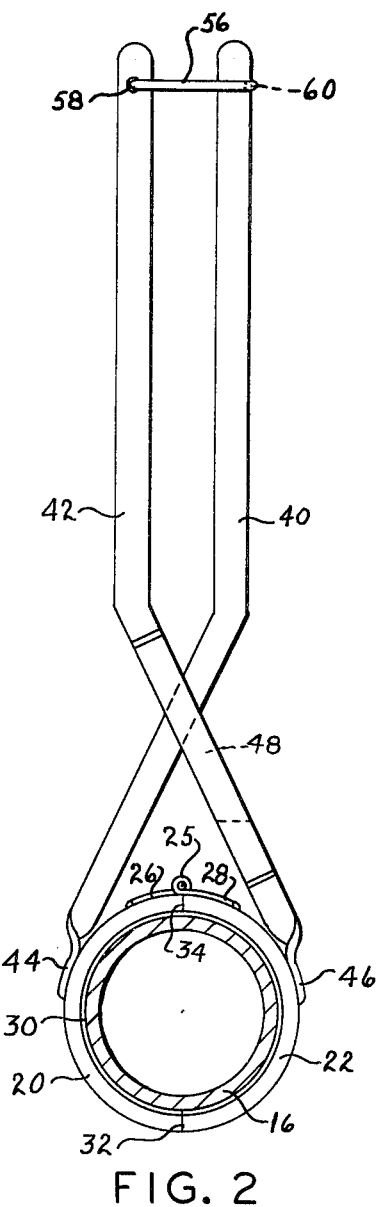
FIGURE 2 is a side elevational view of the clamp shown in FIGURE 1, showing it in its closed position around a water pipe.

Referring more specifically to the drawings, numeral 10 designates generally the present emergency water main break clamp, having a clamp portion 12 and an operating handle structure 14. Since, as illustrated in FIGURE 2, the clamp portion completely surrounds and encloses the pipe, indicated by numeral 16, various size clamp portions are required for the various size pipes. In view of the relatively few different size water mains, only a relatively small number of separate clamps are required to prepare for any emergency.

Figure 1:
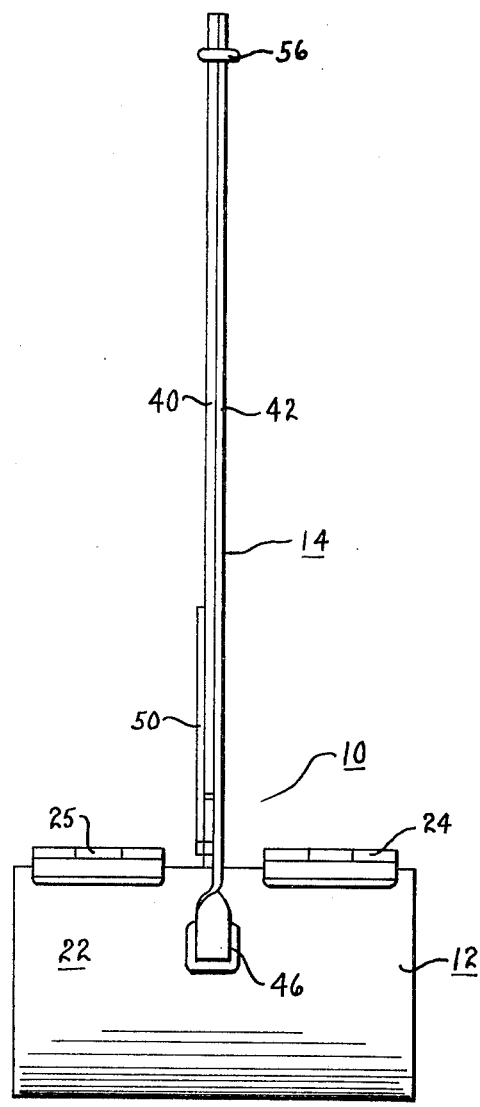
FIGURE 1 is a front elevational view of the present emergency water main break clamp.

The clamp portion consists of two pads 20 and 22 of rigid metal construction joined together by hinges 24 and 25, each having outwardly extending flanges 26 and 28 secured to pads 20 and 22, respectively, by welding or any other suitable joining means. The two pad sections are lined with a sealing material 30 extending over the entire inner surface of the two pads continuously from the point of juncture 32, between the two pads at the the bottom thereof, and spanning the point of juncture 34 between the two pads at the top thereof as viewed in FIGURES 1, 2 and 3. The sealing layer, being of rubber or rubber-like material, readily stretches at the point of juncture 34 to permit the two pads to pivot on the two hinges without rupturing the sealing material. The sealing material is preferably cemented or otherwise joined to the internal surface of the two pads, so that it adheres firmly thereto and moves therewith when the pads are moved between fully opened and fully closed position. When the clamp portion is closed, it is cylindrical in shape externally and provides a cylindrically shaped opening therethrough. The internal diameter of the clamp portion when closed is substantially the same as the external diameter of the pipe for which it is designed in order to provide very substantial pressure on the gasket when the clamp is placed around the pipe, thus compressing the gasket firmly against the external surface of the pipe.

The handle structure consists of two bars 40 and 42 connected to pads 20 and 22, respectively, by feet 44 and 46, welded or otherwise rigidly secured to the external surface of the respective pads. The two bars or handles 40 and 42 are essentially movable independently of one another, since the pivot points for the two handles are hinges 24 and 25. In order to maintain the handles laterally together, a slot 48 is created by a longitudinal member 50 and two end members 52 and 54, the three parts being secured together and to handle 42 by welding, riveting or other suitable securing means, these parts thus forming a fixed slot in handle 42 so that the two handles can move relative to one another without being laterally separated. When the clamp is closed around a pipe, it can be held firmly in clamped position by a link 56 pivotally mounted on handle 42 in a hole 58, for slipping over the upper end of handle 40 and seating in a slot 60 in the upper end of handle 40.

In the operation of the present emergency or temporary clamp, the pipe, which is normally in the ground, is uncovered by digging a relatively narrow hole downwardly and around the pipe. If the water continues to flow through the break in the main, the present clamp is used by opening the handles in the manner illustrated in FIGURE 3 and placing pads 20 and 22 around the pipe. The handles are then moved toward one another, thereby causing the pads to move inwardly around the pipe to firmly clamp the external surface of the pipe, with the hole in the pipe being covered by one or both of the pads. As the handles are moved inwardly, the sealing material 30 is pressed firmly against the external surface of the pipe and the handles are then held in the clamping position by slipping of link 56 over the upper end of handle 40 and into slot 60. The clamp is retained in place until preparation has been made to place the permanent clamp or other leak stopping device on the pipe. During the preparation, any water which had originally seeped or flowed into the dug hole can be removed. After preparations have been made and the present temporary clamp is removed, the permanent clamp or other repair device can be placed in position readily, without any substantial loss of water occurring.

While only one embodiment of the present emergency water main clamp has been described in detail herein, various changes and modifications may be made without departing from the scope of the invention.

I claim:

1. A pipe clamp comprising two arcuate pads, hinge means pivotally connecting said pads along their edges for movement between fully closed and opened positions, a layer of sealing material on the inner surface of each of said pads, a handle connected at one end to one of said pads and extending therefrom on the side on which said hinge is located, a second handle connected at one end to the other of said pads and extending therefrom in the same general direction to and across said first mentioned handle for movement relative thereto in opening and closing said pads in a confined area, said handles being freely movable with respect to one another throughout the normal operating range, one of said handles having a means forming a slot for receiving the other of said handles for movement of said other handle longitudinally with respect to said one handle in opening and closing said pads, and means connected to said handles for retaining said pads in closed position.

2. A pipe clamp as defined in claim 1, in which said pads are elongated in the direction of the pipe and are constructed of rigid, non-yielding material.

3. A pipe clamp as defined in claim 2, in which said hinge means consists of two hinges spaced from one another and used for connecting said pads.

4. A pipe clamp as defined in claim 1, in which said layer of sealing material on the inner surface of each of said pads is continuous over the entire surface thereof and spans the space between the two pads adjacent said hinge means.

5. A pipe clamp as defined in claim 1, in which the means connected to the handles for retaining said pads in closed position consists of a link pivotally attached to the free end of one handle and is adapted to slip over the free end of the other handle into a slot thereon.

References Cited

UNITED STATES PATENTS

| | | | |
|---|---|---|---|
| 64,285 | 4/1867 | Collins | 138—99 |
| 447,818 | 3/1891 | Gerstung | 138—99 |
| 676,582 | 6/1901 | Helmerich | 138—99 XR |
| 1,721,864 | 7/1929 | Johnson | 138—99 |
| 2,325,417 | 7/1943 | Merrill et al. | 138—99 XR |
| 3,117,904 | 1/1964 | Black | 138—99 XR |
| 3,350,050 | 10/1967 | Buczala et al. | 138—99 XR |
| 2,079,505 | 5/1937 | Hopkins | 81—332 |

FOREIGN PATENTS 12,273 8/1888 Great Britain.

SAMUEL ROTHBERG, Primary Examiner

U.S. Cl. X.R.

81—332